United States Patent [19]

Nakajima

[11] Patent Number: 4,556,611

[45] Date of Patent: Dec. 3, 1985

[54] MAGNETIC RECORDING MEDIUM

[75] Inventor: Kaoru Nakajima, Izumi, Japan

[73] Assignee: Sony Corporation, Tokyo, Japan

[21] Appl. No.: 537,397

[22] PCT Filed: Jan. 10, 1983

[86] PCT No.: PCT/JP83/00006

§ 371 Date: Sep. 9, 1983

§ 102(e) Date: Sep. 9, 1983

[87] PCT Pub. No.: WO83/02519

PCT Pub. Date: Jul. 21, 1983

[30] Foreign Application Priority Data

Jan. 10, 1982 [JP] Japan ................................. 57-4355

[51] Int. Cl.$^4$ ............................................. G11B 5/70
[52] U.S. Cl. ......................................... 428/694; 428/695;
428/900; 427/44; 360/134; 360/135; 360/136;
252/62.54; 252/519
[58] Field of Search ................. 252/519, 511, 62.54;
524/504; 428/694, 695, 900 MS File, 522;
523/174; 358/342; 427/44, 54.1, 128; 360/134,
136, 135

[56] References Cited

U.S. PATENT DOCUMENTS 4,396,660 8/1983 Hata et al. ............................ 428/64
4,410,584 10/1983 Toba et al. .......................... 252/511
4,415,630 11/1983 Kubota et al. ....................... 428/694

*Primary Examiner*—Josephine L. Barr
*Attorney, Agent, or Firm*—Hill, Van Santen, Steadman & Simpson

[57] ABSTRACT

The magnetic recording medium of this invention contains in the binder a modified polymer prepared by graft-polymerizing a nitrogen-containing polymerizable unsaturated compound onto a polymer by irradiating with radiation to modify the polymer.

The modified polymer used in this invention is produced by the graft-copolymerization utilizing the irradiation of radiation, the applicable range of polymers used for producing the modified polymer is wide and, thereby providing a large industrial value. Also, since the modified polymer used in this invention has a nitrogen-containing side chain, the modified polymer contributes to improve the dispersibility and packing properties of a magnetic powder in the magnetic layer. Accordingly, a magnetic recording medium having excellent magnetic characteristics and durability can be provided by this invention.

4 Claims, No Drawings

MAGNETIC RECORDING MEDIUM

TECHNICAL FIELD

This invention relates to a magnetic recording medium and, more particularly, to a magnetic recording medium having a superior durability.

BACKGROUND ART

In order to enhance the durability of a magnetic recording medium, there has been employed a method, for example, of providing an improved binding of magnetic powder to a binder using a binder having a high compatibility with the magnetic powder, thus improving dispersibility and packing properties to decrease the rubbing-off of the powder. In this method, it has been proposed that there be employed as a binder a polymer which is modified by the polymerization of its copolymeric ingredients highly compatible with the magnetic powder, thereby improving the binding property of the binder to the magnetic powder. This method, however, requires that all the copolymeric ingredients are capable of being polymerized. Even if this requirement is met, a binder containing a desired amount of copolymeric ingredients cannot be produced or a block copolymer is produced in the absence of a proper relative polymerzation ratio, so that conditions of manufacture are significantly limited. This method is accordingly less valuable and less practical in industrial applications.

DISCLOSURE OF INVENTION

The object of this invention is to provide a magnetic recording medium having a superior durability by using a binder containing a modified polymer.

The modified polymer used in this invention can be obtained by modifying a polymer conventionally used as a binder for magnetic recording media by graft-polymerizing a nitrogen-containing polymerizable unsaturated compound onto the polymer by the irradiation of radiation.

That is, such a modified polymer can be obtained by first irradiating the polymer to be graft-polymerized with a radiation such as gamma rays, electron beams or the like, to generate organic free radicals and then graft-polymerizing the nitrogen-containing polymerizable unsaturated compound to the free radical to modify the polymer. The modified polymer can be also obtained by using a mixture of a polymer usually used as a binder for magnetic recording media and a nitrogen-containing polymerizable unsaturated compound and irradiating the mixture with radiation to perform the graft-polymerization.

Any polymer which can generate free radicals upon being irradiated with radiation and is not degraded by the radiation may be used as the polymer to be modified by the graft polymerization of a nitrogen-containing polymerizable unsaturated compound to the polymer. It is to be noted that, since any organic material without exception can produce free radicals if a radiation having a high penetrating power is used, and since a polymer likely to be degraded by such radiation can produce enough free radicals to react with the nitrogen-containing polimerizable monomer even if the radiation is applied at a small dose under conditions which control degradation, the applicable range of the foregoing method is very broad.

It is preferred that the polymer to which the aforesaid method can be applied has a molecular weight ranging from about 10,000 to about 100,000. Such a polymer may be enumerated by, for example, a vinyl chloride-vinyl acetate copolymer, a vinyl chloride-vinyl propionate copolymer, a vinyl chloride-vinyl acetate-vinyl alcohol copolymer, a vinyl chloride-vinyl propionate-vinyl alcohol copolymer, a vinyl chloride-vinyl acetate-maleic acid copolymer, a vinyl chloride-vinylidene chloride copolymer, a vinyl chloride-acrylonitrile copolymer, an acrylic ester-acrylonitrile copolymer, an acrylic ester-vinylidnene chloride copolymer, a methacrylic ester-vinylidene chloride copolymer, a methacrylic ester-styrene copolymer, a thermoplastic resin, a phenoxy resin, polyvinyl fluoride, a vinylidene chloride-acrylonitrile copolymer, a butadiene-acrylonitrile copolymer, an acrylonitrile-butadiene-acrylic acid copolymer, an acrylonitrile-butadiene-methacrylic acid copolymer, polyvinyl butyral, a cellulose derivative, a styrene-butadiene copolymer, a polyester resin, a phenol resin, an epoxy resin, a thermo-setting polyurethane resin, a urea resin, a melamine resin, an alkyd resin, a urea-formaldehyde resin or the like, or a mixture thereof.

The radiation to be irradiated for graft-polymerizing a nitrogen-containing polymerizable unsaturated compound onto the foregoing polymer may be, for example, gamma rays, an electron beam or the like, and the dose of the radiation is preferably in a range from about 0.1 to about 10 Mrad.

The nitrogen-containing polymerizable unsaturated compound to be graft-polymerized onto the foregoing polymer may include, for example, a nitrogen-containing heterocyclic vinyl compound such as 2-vinylpyridine, 4-vinylpyridine or the like; a dialkylaminoalkyl acrylate or methacrylate such as dimethylaminopropyl acrylate, dimethylaminopropyl methacrylate, dimethylaminoethyl acrylate, dimethylaminoethyl methacrylamide a dialkylaminoalkyl acrylamide or methacrylamide such as dimethylaminoethyl acrylamide, dimethylaminoethyl methacryl-amide, dimethylaminopropyl acrylnoethyl methacryl-amide, dimethylaminopropyl acrylamide, dimethylaminopropyl methacrylamide or the like.

The amount of the polymerizable unsaturated compound is preferred to be about 0.1 to about 10 parts by weight per 100 parts by weight of the polymer to be modified. Where the amount of the polymerizable unsaturated compound is too small, the contribution to the affinity for a magnetic powder by the nitrogen-containing hydrophilic group thus introduced is so insufficient that the dispersibility and packing properties can not be provided to the desired extent. Where the amount is too large, solubility of the modified polymer in a solvent is rendered poor, or it becomes so insoluble that compatibility with other binders is rendered poor. In the case where a magnetic paint is prepared using the modified polymer, it presents the disadvantage that the viscosity of the paint becomes extremely poor to a practically inapplicable extent.

The method of modifying a conventional polymer by reacting with the above-described polymerizable unsaturated compound by the irradiation of radiation is preferably performed by a graft polymerization and the graft-polymerization may be conducted in a conventional manner.

The binder containing the modified polymer to be used in this invention can exhibit a sufficient effect in admixture with the aforementioned conventional binder. When the binder comprising such a modified polymer is used in admixture with the conventional binder, the desired effect is obtained where the modified polymer is contained at least about 1% by weight based on the total binder amount.

The modified polymer to be used in this invention may be used in a system in which a polyfunctional isocyanate compound is combined or in a thermosetting type system in which the modified polymer is combined with the conventional binder as above described and a polyfunctional isocyanate compound.

The magnetic powder may be any one which is conventionally employed for magnetic recording media. Examples of such a magnetic powder may include, an oxide magnetic powder such as gamma-$Fe_2O_3$, $Fe_3O_4$, an iron oxide in an intermediate oxide state between gamma-$Fe_2O_3$ and $Fe_3O_4$, Co-containing gamma-$Fe_2O_3$, Co-containing $Fe_3O_4$, a Co-containing iron oxide in an intermediate oxide state between gamma-$Fe_2O_3$ and $Fe_3O_4$, the aforesaid iron oxide each further containing one or more metal elements (in particular, transition metal elements), the aforesaid iron oxides each having coating composed mainly of cobalt oxide or cobalt hydroxide, $CrO_2$, $CrO_2$ the surface of which is subjected to a reduction treatment to form a $Cr_2O_3$ layer, and so forth, and a ferromagnetic fine powder such as a metal such as Fe, Co, Ni, and so forth and an alloy such as an Fe-Co alloy, an Fe-Ni alloy, an Fe-Co-Ni alloy, a Co-Ni-P alloy, a Co-Ni-Fe-B alloy, an Fe-Ni-Zn alloy, an Fe-Mn-Zn alloy, an Fe-Co-Ni-P alloy and so forth.

The magnetic paint to be used in this invention containing the modified polymer and a magnetic powder may further contain, if necessary, an abrasive such as aluminum oxide, chromium oxide, silicon oxide or the like; an antistatic agent such as carbon black, or the like; and a lubricant such as molybdenum disulfide, graphite, silicone oil, olive oil or the like.

A non-magnetic substrate on which a magnetic layer is formed by coated with the magnetic paint containing the above-described components may be a film or sheet comprising a non-magnetic material such as, for example, a polyester such as polyethylene terephthalate or the like; a polyolefin such as polypropylene or the like; a cellulose derivative such as cellulose triacetate, cellulose diacetate or the like; a polycarbonate; polyvinyl chloride; polyimide; a metal such as aluminum copper or the like; paper or the like.

A solvent capable of being used for the preparation of the magnetic paint may include, for example, a ketone such as acetone, methyl ethyl keton, methyl isobutyl ketone, cyclohexanone or the like; an alcohol such as methanol or the like; an ester such as methyl acetate, ethyl acetate, butyl acetate, ethyl butyrate or the like; a glycol ether such as ethylene glycol dimethyl ether, ethylene glydol monoethyl ether, dioxane or the like; an aromatic hydrocarbon such as benzene, toluene, xylene or the like; an aliphatic hydrocarbon such as hexane, heptane or the like, and a mixture thereof. In the magnetic recording medium in accordance with this invention, the magnetic powder used therein shows good adhesion to the nonmagnetic substrate and also the magnetic powder has improved dispersibility, packing properties and surface properties, so that the magnetic recording medium has excellent magnetic characteristics and durability.

BEST MODE OF CARRYING OUT THE INVENTION

This invention will be described further by way of examples.

EXAMPLE 1

A modified polyurethane was prepared by mixing 100 parts by weight of a polyurethane (tradename "N-2304", manufactured by Nippon Polyurethan Kogyo K.K.) with 5 parts by weight of 2-vinylpyridine, forming the mixture in a sheet form having a thickness of about 100 μm, and irradiating it with an electron beam of 5 Mrad.

With the modified polyurethane, a magnetic paint having the following composition was prepared.

Modified polyurethane 100 parts by weight
γ-$Fe_2O_3$ 400 parts by weight
Squalane 9 parts by weight
$Cr_2O_3$ 4 parts by weight
Methyl ehtyl ketone 500 parts by weight
Methyl isobutyl ketone 500 parts by weight The paint composition containing the above components was milled to give a magnetic paint, and the magnetic paint was coated on a polyester base film having a thickness of 16 μm to a thickness of 4 μm. The film was dried and then cut into magnetic tapes.

EXAMPLE 2

A paint having the following composition was coated on a polyester base film having a thickness of 16 μm to a thickness of 4 μm and then magnetic tapes were prepared in the same manner as in Example 1.

γ-$Fe_2O_3$ 400 parts by weight
Modified polyurethane 30 parts by weight
Vinyl chloride-vinyl acetate-vinyl alcohol copolymer (tradename "VAGH", manufactured by Union Carbide Corp.) 70 parts by weight
Squalane 9 parts by weight
$Cr_2O_3$ 4 parts by weight
Methyl ethyl ketone 500 parts by weight
Methyl isobutyl ketone 500 parts by weight Comparative Example 1

By following the same procedure as in Example 1 except that the unmodified polyurethane (tradename "N-2304") was used in place of the modified polyurethane, magnetic tapes were prepared.

Comparative Example 2

Magnetic tapes were prepared in the same procedure as in Example 2 with the exception that the unmodified polyurethane (tradename "N-2304") was used in place of the modified polyurethane.

The magnetic tapes prepared according to the aforementioned Examples and Comparative Examples were measured for Bm, Rs, gloss, rubbing-off rating, and still. The results are shown in the following table. In this measurement, gloss was determined with a commercially available gloss meter by measuring an amount of reflected light arising from incident light at an incident angle of 75°. The larger the value thereof, that is, the closer to 100%, the better the surface quality. The rubbing-off rating was determined by an amount of powder attached to a magnetic head, tape guide and so on after running the tape. The still was defined as the time required for the reduction of output signals from an initial level to a predetermined level by repeated scanning of the same portion of a magnetic tape with the magnetic head of a household VTR.

TABLE

|  | Bm | Rs (%) | Gloss (%) | Rabbing-Off Ratings | Still (min.) |
|---|---|---|---|---|---|
| Example 1 | 1,420 | 82 | 93 | good | 920 |
| Example 2 | 1,440 | 83 | 104 | good | 840 |
| Comparative example 1 | 1,360 | 75 | 69 | bad | 800 |
| Comparative example 2 | 1,320 | 77 | 77 | bad | 820 |

From these results, it has been confirmed that the magnetic tapes of this invention are excellent in not only electromagnetic conversion characteristics but also surface properies and durability.

I claim:

1. A magnetic recording medium including:
   a non-magnetic substrate,
   a magnetic layer secured to said substrate, said magnetic layer including a binder and magnetic particles dispersed therein, said binder consisting essentially of a modified organic resin capable of generating free radicals when exposed to irradiation without degradation and having a molecular weight originally of from 10,000 to 100,000, said binder including a modified polymer produced by graft polymerization of said organic resin with a nitrogen-containing polymerizable unsaturated compound, said nitrogen-containing polymerizable unsaturated compound being present in an amount of from 0.1 to 10 parts by weight per 100 parts by weight of said organic resin, said graft polymerization being carried out by application of a graft-polymerization dosage of said irradiation.

2. A magnetic recording medium according to claim 1, characterized in that the modified polymer is contained in an amount of not less than 1% by weight based on a total binder amount.

3. A magnetic recording medium according to claim 1, characterized in that the radiation is an electron beam.

4. A magnetic recording medium according to claim 1, characterized in that the radiation is irradiated at a dose ranging from 0.1 to 10 Mrad.

* * * * *